Figure 1:
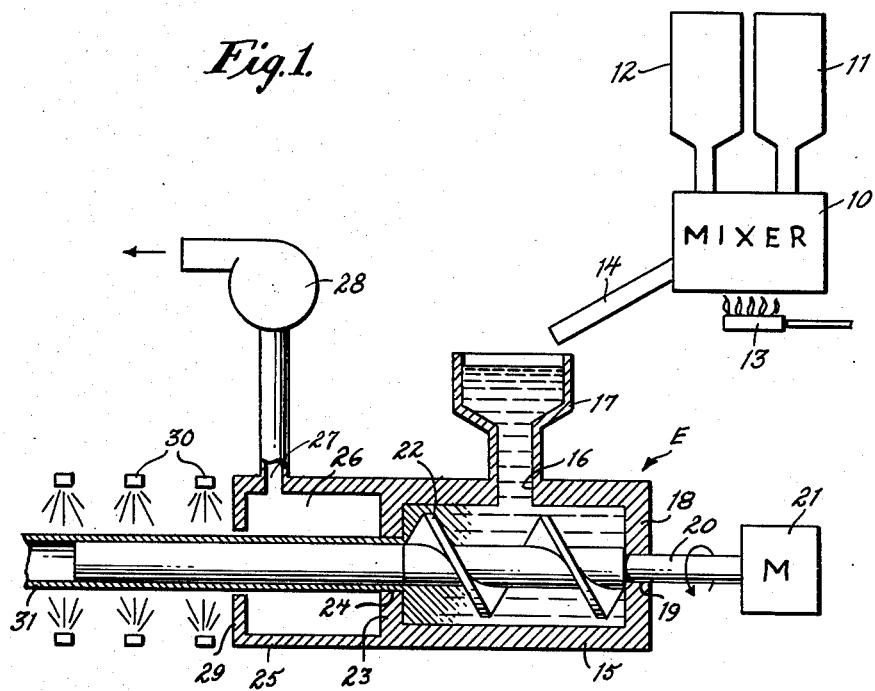

Oct. 10, 1961   J. W. HUNKELER   3,003,194
METHOD OF PRODUCING BITUMINOUS GLASS-FIBER PIPE
Filed June 16, 1959

INVENTOR.
JULES W. HUNKELER
BY John A. Robertson
ATTORNEY.

United States Patent Office 3,003,194
Patented Oct. 10, 1961

3,003,194
METHOD OF PRODUCING BITUMINOUS GLASS-FIBER PIPE
Jules W. Hunkeler, Edmonton, Alberta, Canada, assignor to Perma Tubes Ltd., Edmonton, Alberta, Canada, a corporation of Canada
Filed June 16, 1959, Ser. No. 820,698
2 Claims. (Cl. 18—55)

The present invention relates to bituminous glass-fiber pipe, and is concerned primarily with a novel method of producing such pipe whereby the resulting product has improved strength characteristics.

At the present time, it is known to manufacture pipe comprising a mixture of bitumen and glass fiber. However, the known methods of producing such pipe result in a product having properties of strength that are not as great as desired under many circumstances. With the foregoing conditions in mind, the present invention has in view as its foremost objective the provision of a novel method of producing bituminous glass-fiber pipe and which method is essentially characterized by the step of extruding a molten or liquid mixture of bitumen and glass fiber under pressure through a die to form the pipe. The pipe so formed will have a good solid homogeneous body in which all voids are completely eliminated, and will exhibit properties of strength in excess of any pipe of this character heretofore known.

A further object of the invention is to provide, in a method of the character indicated, the step of extruding under pressure which is accompanied by the creation of a partial vacuum on one side of the die. The use of a high-pressure-vacuum extrusion process further enhances the desirable quality of the formed product.

Still another object of the invention is to provide a method of the character indicated in which the pipe is continuously formed. Such a method involves the use of an auger- or screw-type extruder. As the pipe is continuously formed, it may be cut off into desired lengths.

Another object of the invention is to provide a method of the type indicated in which predetermined lengths of pipe are formed by a press. Such lengths are subject to being subsequently deformed into other shapes such as L's, T's, and similar accessory shapes.

In carrying out the method above indicated, a molten or liquid mixture of the bitumen, glass fibers, and mineral filler is extruded through a die. An important step of the present invention is to apply a cooling medium to the pipe as it comes from the die to harden and set the same.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a method of producing bituminous glass-fiber pipe which consists essentially of extruding a molten mixture of bitumen and glass fiber through a die and applying a cooling medium to the formed pipe.

Figure 2:
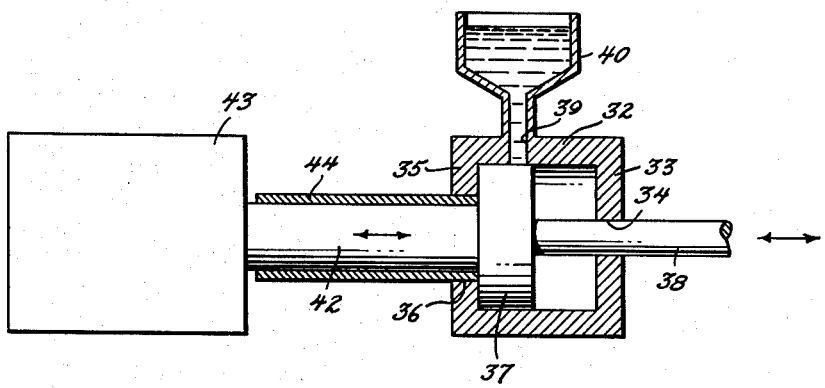

For a full and more complete understanding of the invention, reference may be had to the following description and accompanying drawing, wherein:

FIGURE 1 is a diagrammatic view depicting apparatus which may be employed to carry out the method of continuously producing the pipe; and FIGURE 2 is another diagrammatic view illustrating the apparatus which is used in producing predetermined lengths of the pipe.

In practicing the method of this invention, the following materials are employed: The bitumen may be asphalt, coal tar, gilsonite, or other pyrobitumens. As a preferred example, liquid asphalt at a temperature of 450°–500° F. is employed.

The glass fibers are preferably staple glass fibers which have been chopped into lengths ranging from one to one and one-half inches. The mineral filler preferably is a mixture of asbestos shorts and limestone.

While the materials employed are susceptible of a fairly wide range of proportions, in a preferred embodiment of the invention the glass fibers will constitute 10–20% of the total mixture, and the mineral filler will also constitute 10–20% of the total mixture, with the remainder of the mixture consisting of the asphalt or other bitumen.

Referring now to FIGURE 1 of the drawing, a mechanical mixer is shown at 10. A hopper 11 supplies the glass fibers to the mixer 10, while a second hopper 12 supplies the mineral filler. Molten or liquid asphalt at a temperature of 450°–500° F. is also supplied to the mixer and is maintained at the desired temperature by the heat source represented at 13. It will be understood that the mixer 10 is a conventional mechanical mixer which thoroughly intermixes the ingredients. The mixed ingredients are conveyed from the mixer 10 by a delivery spout 14.

An auger- or screw-type extruder is referred to in its entirety by the reference character E. The extruder E comprises a cylindrical casing 15 having an inlet port at 16 with which communicates a supply funnel 17. The molten mixture is delivered to this funnel 17 from the conveyor spout 14 and enters the chamber defined by the casing 15.

The casing 15 is closed at one end by a head 18 which is formed with a bearing opening 19. Journaled in this bearing opening 19 is a shaft 20 that is driven from any appropriate source of power, such as the motor represented at 21.

Mounted on the shaft 20 within the casing 15 is a screw 22.

The end of the casing remote from the head 18 takes the form of a die 23 that is formed with a central circular opening at 24. The shaft 20 is continued through this opening 24, with the circumferential surface of the shaft spaced from the surface defining the opening, with the two complementing one another to define the die in which the pipe is formed.

On the side of the die wall 23 opposite to the casing 15, a second casing 25 is provided which defines a vacuum chamber 26. An exhaust conduit 27 communicates with this chamber 26, and is provided with exhaust means in the form of the blower indicated at 28.

The shaft 20 is continued as a mandrel through and beyond the chamber 26, and which mandrel carries the formed pipe. The end wall of the chamber 26 is represented at 29, and on the exterior of this wall there are a plurality of spray nozzles 30 which apply a cooling medium to the formed pipe.

It is evident that the apparatus disclosed in FIGURE 1 is operative to continuously form a pipe which may subsequently be cut off into desired lengths. Thus the molten mixture of asphalt, glass fibers, and mineral filler is delivered to the chamber defined by the casing 15, head 18, and die wall 23. As the shaft 20 is rotated, the screw or auger 22 is turned and the molten mixture is extruded under pressure through the space defined by the shaft extension and opening 24. At the same time, the blower 28 is operated to create a partial vacuum within the chamber 26. The pipe is thus formed on the shaft extension, and is set by the application of the cooling medium. The formed pipe is represented at 31 and, as above noted, may be cut off into desired lengths.

When it is desired to form predetermined lengths of pipe which are intended to be subsequently shaped into various forms such as L's and T's, a press may be employed to achieve the extrusion process. Such a press is represented diagrammatically in FIGURE 2 and is shown as comprising a cylindrical casing 32 having a head 33 at one end formed with a central opening 34, and a die head 35 at the opposite end formed with a die opening 36.

A piston 37 is mounted for reciprocation within the chamber defined by the cylindrical wall 32, head 33, and die wall 36. This piston is carried by a rod 38 which passes through the opening 34 and which is imparted a reciprocating motion by any appropriate power source (not illustrated).

The cylindrical wall 32 is formed with an inlet port 39 with which communicated a supply funnel 40. The molten mixture of bitumen, glass fiber, and mineral filler may be supplied to this funnel 40 by the comparable apparatus depicted in FIGURE 1.

A retractable mandrel is shown at 42, and one end thereof projects into the opening 36 in spaced relation thereto. The mandrel is operated by mechanism depicted diagrammatically at 43.

On a return or backstroke of the piston 37, the inlet port 39 is opened and a predetermined amount of the mixture of asphalt, glass fibers, and mineral filler will enter into and fill the space in front of the piston. On the pressure or forming stroke of the piston, this predetermined amount of the mixture is forced under pressure through the die space as defined by the end of the mandrel 42 and the opening 36. At the same time, the port 39 is closed. A length of pipe is thus formed about the mandrel 42, whereupon the latter may be retracted by the mechanism depicted at 43 to permit the removal of the formed length of pipe which is represented at 44. This length may then be subjected to subsequent forming operation to shape it into an L, T, or other shape desired. A cooling medium may be applied either before or after such forming operations.

While preferred specific embodiments of the invention are hereinbefore set forth, it is to be clearly understood that the invention is not to be limited to the exact proportions, steps, and materials illustrated and described, because various modifications of these details may be provided in putting the invention into practice within the purview of the appended claims.

What is claimed is:

1. In the production of bituminous glass-fiber pipe, the method comprising the steps of (a) mechanically intermixing molten asphalt at a temperature of 450–500° F., staple glass fibers of a length ranging from 1" to 1½", and a mineral filler comprising asbestos shorts and limestone, with the glass fibers constituting 10–20% of the mixture and the mineral filler 10–20% of the total mixture, and (b) continuously extruding said mixture in a workable condition under pressure through a die and directly into a vacuum chamber on the opposite side of said die to form a pipe.

2. In the production of bituminous glass-fiber pipe, the method comprising the steps of (a) mechanically intermixing molten asphalt at a temperature of 450°–500° F., staple glass fibers of a length ranging from 1" to 1½", and a mineral filler comprising asbestos shorts and limestone, with the glass fibers constituting 10–20% of the mixture and the mineral filler 10–20% of the total mixture, (b) continuously extruding said mixture in a workable state under pressure through a die and directly into a vacuum chamber on the opposite side of said die to form a pipe, and (c) applying a cooling medium to the formed pipe.

References Cited in the file of this patent

UNITED STATES PATENTS

| | | |
|---|---|---|
| 284,794 | Allen | Sept. 11, 1883 |
| 1,785,457 | Pfohl | Dec. 16, 1930 |
| 2,245,640 | Beattie | June 17, 1941 |
| 2,718,822 | Magnani | Sept. 27, 1955 |
| 2,790,464 | Stephens | Apr. 20, 1957 |